(12) United States Patent
Nelson et al.

(10) Patent No.: US 8,495,240 B2
(45) Date of Patent: Jul. 23, 2013

(54) METHOD AND APPARATUS FOR DATA COMMUNICATION UTILIZING THE NORTH AMERICAN TERRESTRIAL SYSTEM

(75) Inventors: Eric A. Nelson, Bellevue, WA (US);
Michael B. O'Meara, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1626 days.

(21) Appl. No.: 11/688,600

(22) Filed: Mar. 20, 2007

(65) Prior Publication Data
US 2007/0220109 A1   Sep. 20, 2007

Related U.S. Application Data

(62) Division of application No. 10/819,944, filed on Apr. 8, 2004, now Pat. No. 7,194,523, which is a division of application No. 09/312,011, filed on May 14, 1999, now Pat. No. 6,760,778.

(60) Provisional application No. 60/099,496, filed on Sep. 9, 1998, provisional application No. 60/106,761, filed on Nov. 3, 1998.

(51) Int. Cl.
*G06F 15/16* (2006.01)
(52) U.S. Cl.
USPC .......................................... 709/236; 709/250
(58) Field of Classification Search
None
See application file for complete search history.

(56) References Cited

U.S. PATENT DOCUMENTS

| | | | |
|---|---|---|---|
| 4,642,775 A | 2/1987 | Cline et al. | |
| 5,179,571 A | 1/1993 | Schilling | |
| 5,222,128 A | 6/1993 | Daly et al. | |
| 5,265,024 A | 11/1993 | Crabill et al. | |
| 5,371,782 A | 12/1994 | Casey et al. | |
| 5,381,140 A | 1/1995 | Kuroda et al. | |
| 5,412,660 A | 5/1995 | Chen et al. | |
| 5,438,610 A | 8/1995 | Bhagat et al. | |
| 5,448,768 A | 9/1995 | Zinser | |
| 5,459,469 A | 10/1995 | Schuchman et al. | |
| 5,473,679 A | 12/1995 | La Porta et al. | |

(Continued)

FOREIGN PATENT DOCUMENTS

| EP | 0 828 353 A2 | 3/1998 |
|---|---|---|
| EP | 0 890 907 A1 | 1/1999 |

(Continued)

OTHER PUBLICATIONS

Lemme, Peter et al., *Email from an Aircraft: High Speed and Low Cost?*, www.airfax2000.com/wp/03062000.asp, pp. 1-3, Mar. 2000.

(Continued)

*Primary Examiner* — Patrice Winder
(74) *Attorney, Agent, or Firm* — Turocy & Watson, LLP

(57) ABSTRACT

A method and apparatus for enhancing the current data communication capabilities of the North American Terrestrial System (NATS) Network is presented. In accordance with an embodiment of the present invention, an airborne data server (ADS) is added to the airborne architecture of the current NATS Network and a ground data gateway (GDG) is added to the ground-based architecture of the current NATS Network. The ADS functions as a router/gateway connected to many local area networks (LANs) aboard the aircraft. The ADS provides for the automation of data services such as scheduling, routing and translation. The GDG is the central hub for the network and dispatcher of data to customer premises or to the aircraft.

20 Claims, 8 Drawing Sheets

U.S. PATENT DOCUMENTS

| | | | |
|---|---|---|---|
| 5,524,146 A | 6/1996 | Morrisey et al. | |
| 5,524,272 A | 6/1996 | Podowski et al. | |
| 5,530,945 A | 6/1996 | Chavez, Jr. et al. | |
| 5,533,027 A | 7/1996 | Akerberg et al. | |
| 5,555,446 A | 9/1996 | Jasinski | |
| 5,557,656 A | 9/1996 | Ray et al. | |
| 5,557,658 A | 9/1996 | Gregorek et al. | |
| 5,577,103 A | 11/1996 | Foti | |
| 5,579,379 A | 11/1996 | D'Amico et al. | |
| 5,583,917 A | 12/1996 | Jonsson | |
| 5,621,734 A | 4/1997 | Mann et al. | |
| 5,627,546 A | 5/1997 | Crow | |
| 5,627,548 A | 5/1997 | Woo et al. | |
| 5,657,032 A | 8/1997 | Liechty et al. | |
| 5,657,373 A | 8/1997 | Hermansson et al. | |
| 5,714,948 A | 2/1998 | Famakis et al. | |
| 5,760,819 A | 6/1998 | Sklar et al. | |
| 5,798,726 A | 8/1998 | Schuchman et al. | |
| 5,805,633 A | 9/1998 | Uddenfeldt | |
| 5,805,683 A | 9/1998 | Berberich | |
| 5,815,810 A | 9/1998 | Gallant et al. | |
| 5,850,445 A | 12/1998 | Chan et al. | |
| 5,862,471 A | 1/1999 | Tiedemann, Jr. et al. | |
| 5,862,490 A | 1/1999 | Sasuta et al. | |
| 5,878,215 A | 3/1999 | Kling et al. | |
| 5,881,235 A | 3/1999 | Mills | |
| 5,884,157 A | 3/1999 | Karmi | |
| 5,887,258 A | 3/1999 | Lemozit et al. | |
| 5,890,079 A | 3/1999 | Levine | |
| 5,894,596 A | 4/1999 | Hayes, Jr. | |
| 5,915,214 A | 6/1999 | Reece et al. | |
| 5,923,743 A * | 7/1999 | Sklar | 379/177 |
| 5,940,381 A | 8/1999 | Freeburg | |
| 5,946,618 A | 8/1999 | Agre et al. | |
| 5,950,129 A | 9/1999 | Schmid et al. | |
| 5,969,318 A | 10/1999 | Mackenthun | |
| 5,973,722 A | 10/1999 | Wakai et al. | |
| 5,974,349 A | 10/1999 | Levine | |
| 5,983,227 A | 11/1999 | Nazem et al. | |
| 5,990,928 A | 11/1999 | Sklar | |
| 5,991,596 A | 11/1999 | Cunningham et al. | |
| 5,995,725 A | 11/1999 | Dillon | |
| 6,014,557 A | 1/2000 | Morton et al. | |
| 6,014,561 A | 1/2000 | Molne | |
| 6,014,606 A | 1/2000 | Tu | |
| 6,034,950 A | 3/2000 | Sauer et al. | |
| 6,038,223 A | 3/2000 | Hansson et al. | |
| 6,038,456 A | 3/2000 | Colby et al. | |
| 6,047,176 A | 4/2000 | Sakamoto et al. | |
| 6,061,562 A | 5/2000 | Martin et al. | |
| 6,064,887 A | 5/2000 | Kallioniemi et al. | |
| 6,078,805 A | 6/2000 | Scott | |
| 6,088,598 A | 7/2000 | Marsolais | |
| 6,088,717 A | 7/2000 | Reed et al. | |
| 6,112,078 A | 8/2000 | Sormunen et al. | |
| 6,138,016 A | 10/2000 | Kulkarni et al. | |
| 6,147,980 A * | 11/2000 | Yee et al. | 370/316 |
| 6,173,159 B1 | 1/2001 | Wright et al. | |
| 6,173,332 B1 * | 1/2001 | Hickman | 709/235 |
| 6,181,990 B1 | 1/2001 | Grabowsky et al. | |
| 6,201,797 B1 | 3/2001 | Leuca et al. | |
| 6,212,377 B1 | 4/2001 | Dufour et al. | |
| 6,215,811 B1 | 4/2001 | Yuen | |
| 6,219,694 B1 | 4/2001 | Lazaridis et al. | |
| 6,240,513 B1 | 5/2001 | Friedman et al. | |
| 6,249,913 B1 * | 6/2001 | Galipeau et al. | 725/76 |
| 6,269,243 B1 | 7/2001 | Corbefin et al. | |
| 6,285,878 B1 | 9/2001 | Lai | |
| 6,292,835 B1 | 9/2001 | Huang | |
| 6,308,045 B1 | 10/2001 | Wright et al. | |
| 6,332,077 B1 | 12/2001 | Wu et al. | |
| 6,404,769 B1 * | 6/2002 | Kapoor | 370/398 |
| 6,463,270 B1 | 10/2002 | Chang et al. | |
| 6,477,152 B1 | 11/2002 | Hiett | |
| 6,529,706 B1 | 3/2003 | Mitchell | |
| 6,636,721 B2 | 10/2003 | Threadgill et al. | |
| 6,646,998 B1 | 11/2003 | Rasanen | |
| 6,675,208 B1 | 1/2004 | Rai et al. | |
| 6,760,757 B1 | 7/2004 | Lundberg et al. | |
| 6,760,778 B1 | 7/2004 | Nelson et al. | |
| 6,785,712 B1 | 8/2004 | Hogan et al. | |
| 6,795,408 B1 | 9/2004 | Hiett | |
| 7,020,708 B2 | 3/2006 | Nelson et al. | |
| 7,035,634 B2 | 4/2006 | Mead et al. | |
| 7,177,939 B2 | 2/2007 | Nelson et al. | |
| 7,194,523 B2 | 3/2007 | Nelson et al. | |
| 2001/0041553 A1 | 11/2001 | Chang et al. | |
| 2002/0032006 A1 | 3/2002 | Nair et al. | |
| 2002/0072389 A1 | 6/2002 | Ward et al. | |
| 2003/0003872 A1 | 1/2003 | Brinkley et al. | |
| 2003/0041155 A1 | 2/2003 | Nelson et al. | |
| 2003/0055975 A1 | 3/2003 | Nelson et al. | |
| 2004/0193732 A1 | 9/2004 | Nelson et al. | |
| 2005/0220055 A1 | 10/2005 | Nelson et al. | |
| 2007/0220109 A1 | 9/2007 | Nelson et al. | |

FOREIGN PATENT DOCUMENTS

| | | |
|---|---|---|
| EP | 890907 | 1/1999 |
| EP | 1 017 188 A2 | 7/2000 |
| EP | 1209928 | 5/2002 |
| FR | 2788922 A1 | 7/2000 |
| WO | 9603846 | 2/1996 |
| WO | 0014987 | 3/2000 |
| WO | 02103931 | 12/2002 |
| WO | 02103932 A1 | 12/2002 |

OTHER PUBLICATIONS

Kerr, R.B.: *Data communications management for the Boeing 777 airplane*, IEEE Digital Avionics Systems Conference, pp. 51-56, Nov. 1995.

Perkins, C.: *IP Mobility Support*, Network working Group, Request for Comment: 2002, pp. 1-79, Oct. 1996.

ISR mailed Dec. 6, 2002 for PCT Application No. PCT/ US 02/ 19337, 3 pages.

ISR mailed Oct. 8, 2002 for PCT Application No. PCT/ US 02/ 19336, 5 pages.

OA dated Mar. 18, 2010 for U.S. Appl. No. 11/143,738, 15 pages.

OA dated Apr. 1, 2009 for U.S. Appl. No. 11/143,738, 15 pages.

OA dated Apr. 17, 2008 for U.S. Appl. No. 11/143,738, 17 pages.

OA dated Sep. 21, 2007 for U.S. Appl. No. 11/143,738, 16 pages.

OA dated Sep. 30, 2008 for U.S. Appl. No. 11/143,738, 15 pages.

* cited by examiner

METHOD AND APPARATUS FOR DATA COMMUNICATION UTILIZING THE NORTH AMERICAN TERRESTRIAL SYSTEM

CROSS REFERENCES TO RELATED APPLICATIONS

This application claims the benefit of U.S. provisional application No. 60/106,761 filed Nov. 3, 1998, entitled "A New Approach To Data Communications Utilizing the North American Terrestrial System."

BACKGROUND

The present invention relates to data communication between an aircraft and a ground-based destination device. More particularly, the present invention relates to a method and apparatus for enhancing the current data communication capabilities of the North American Terrestrial System (NATS) Network.

Current data service offerings to commercial aircraft are limited in function and capability. One of the known systems for transmitting data to and from an aircraft is the Aircraft Communication Addressing and Reporting System (ACARS). The ACARS system is primarily used to transmit two types of data. The first type of data is known as safety data. Safety data is transmitted from the pilot/flight crew to the tower or the dispatch and includes information such as the aircraft's heading and the aircraft's altitude. The second type of data is known as operational/administrative data. Operational/administrative data is transmitted from the aircraft to the dispatch and may include, for example, information which indicates when particular equipment aboard the aircraft is in need of repair.

The ACARS system typically comprises an ACARS management unit (MU) and a very high frequency (VHF) transceiver. In general terms, the ACARS MU collects aircraft data from various sources aboard the aircraft (such as avionics equipment) and sends the collected data to the VHF transceiver. The VHF transceiver encapsulates the data in accordance with a protocol, modulates a frequency channel using the encapsulated data, and transmits the modulated frequency channel to the control tower or the dispatch. Upon successfully receiving data, the tower or the dispatch uses a frequency channel to transmit an acknowledgment message to the originating aircraft.

There are several drawbacks associated with the ACARS system. First, the number of channels available for transmitting data is limited. The geographic region of the United States is subdivided into a number of Air Traffic Control (ATC) regions. Each ATC region is allocated only one channel for ACARS system transmissions. Thus, each ACARS equipped aircraft within a particular ATC region must share the same channel.

A second drawback is that the ACARS system is limited to transmitting short messages. The system is not suitable for transmitting files of data to and from an aircraft. Third, the ACARS system is not intended for public correspondence. Thus, passengers aboard an aircraft are unable to use ACARS to transmit data from the aircraft.

Another drawback associated with the ACARS system is that the system lacks an encryption method. Some of the data transmitted to and from the aircraft is considered sensitive. One example of such sensitive data is aircraft performance data. Aircraft performance data may include parameters such as engine vibration, engine temperature, and whether or not the tail of the aircraft was dragged across the ground during a take-off or a landing. This type of information is considered sensitive because it could be used to indicate that the pilot did something wrong while flying the aircraft.

Finally, the ACARS system implements protocols which, although widely used within the aviation community, are incompatible with commercial "off the shelf" software and protocols. The use of these protocols makes it difficult to develop new application software to run over the ACARS data link. Further, system enhancements and upgrades are difficult because there are a limited number of software developers/engineers familiar with how the ACARS protocols are implemented.

Another known system which provides limited data communication between an aircraft and a ground station is known as the North American Terrestrial System (NATS) Network. The NATS Network comprises a NATS radio set aboard each subscribing aircraft and more than 150 AT&T Corp. NATS ground stations strategically located throughout the continental U.S., Canada, and Mexico in order to provide full coverage to subscribing aircraft at cruise altitude. Each of the over 150 ground stations are connected to both a public switched telephone network (PSTN) and a wide area network (WAN). In addition, micro-cell ground stations are deployed at key airports to provide localized ground coverage to aircraft on the tarmac or at the gate.

Aboard each subscribing aircraft, a plurality of telephone handsets are adapted to be connected to each NATS radio set. These telephone handsets are adapted to facilitate connecting a device such as a laptop computer to the NATS radio set. Passengers may use the telephone handsets to exchange voice information with ground-based telephones via the NATS radio set, the ground stations and the PSTN. Similarly, passengers may exchange data with ground-based systems via the NATS radio set, the ground stations and the WAN.

The NATS radio set operates in the UHF range. The air-to-ground transmit band is located between 894 and 896 MHZ. The ground-to-air band is between 849 and 851 MHZ. Each band is broken into 10 channel blocks which contain 29-6 kHz wide user channels (one for uplink and one for downlink). Additionally 6-3.2 KHz wide control channels (a.k.a. pilot channels) are available in each channel block. Each ground station is assigned one of the 10 channel blocks. These pilot channels are used by the ground station to broadcast frequency availability and sundry other status and control messages to the airborne radios. One of the six available pilot channels is assigned to each service provider. Thus, aircraft flying over a geographic region served by a particular ground station may exchange voice and data information with ground-based systems using one of the 29 channels available to that ground station.

Unfortunately, the NATS Network is primarily intended to facilitate voice (rather than data) transmission to and from an aircraft. NATS voice and data transmissions are implemented in accordance with a technique known as circuit mode. In circuit mode, one telephone handset or one laptop computer connected to a telephone handset aboard a subscribing aircraft may exchange voice or data information with one ground-based destination device using one available NATS channel. Each user aboard an aircraft is assigned one channel for the duration of the time they are transmitting and receiving information.

As a subscriber aircraft flies over a geographic region, the NATS radio set continuously monitors the signal strength from the available ground stations and transmits data to the ground station which is currently providing the strongest signal strength. In circuit mode, the process of switching ground stations breaks the transmission link between the aircraft and the ground station. Thus, data transmission is interrupted during the switching process.

Circuit mode transmission may be contrasted with a technique known as packet mode. In accordance with packet mode, multiple users aboard an aircraft might share a singe channel to transmit data to multiple different destination addresses. Due to circuit mode implementation and other NATS Network constraints, only a limited number of users aboard any one aircraft may simultaneously make telephone calls from the aircraft and only a limited number of users aboard any one aircraft may simultaneously use their laptop computers to transmit and receive data from the aircraft.

Thus, there is a need for a method and apparatus which solves the above described problems.

SUMMARY OF THE INVENTION

Current data service offerings to commercial aircraft are limited in function and capability. Customers such as airlines are seeking alternatives to enhance data capabilities to and from the aircraft while integrating it into their information network. Of course, any solution proposed must be cost effective as well as technically capable.

The present invention is a method and apparatus which utilizes the AT&T North American Terrestrial System (NATS) Network to provide enhanced data capability for customers to support data traffic to or from the aircraft. An OSI-based approach is utilized for the presentation that includes stack definition at each network node. In accordance with an embodiment of the present invention, an on-board network architecture is centralized around an Airborne Data Server (ADS). The ADS is a router/gateway connected to many on-board LANs that provide automation of data services (scheduling, routing, translation). Also in accordance with the present invention, an embodiment includes an air-to-ground digital cellular radio network (AT&T NATS), which utilizes a token-based forwarding scheme based on IP packets. Mobility is also an important aspect of the present invention. The benefits of the present invention include enhanced data rates, security, quality of service reliability, and service type (short message vs. block transfer).

In accordance with an embodiment of the present invention, a Ground Data Gateway (GDG) is the central data hub for the network and dispatcher of data to customer premises equipment or to the aircraft. In another embodiment, the AT&T NATS data network is used to support backchannel (uplink data requests) communications in conjunction with a high bandwidth forward channel (downlinking HTTP, large files, etc.) for high bandwidth systems. The present invention also supports transporting voice over Internet protocol (IP) networks.

DETAILED DESCRIPTION

The present invention enhances the data services currently offered to commercial aircraft by modifying the current AT&T North American Terrestrial System (NATS) Network. As mentioned above, the current NATS Network is primarily intended to facilitate voice (rather than data) transmission to and from an aircraft. In accordance with an embodiment of the present invention, the current capabilities of the NATS Network are enhanced by adding an airborne data server (ADS) to the airborne architecture of the current NATS Network and by adding a ground data gateway (GDG) to the groundbased architecture of the current NATS Network. This embodiment eliminates the above-described ACARS system single channel sharing constraint by enabling subscribing aircraft within a particular ATC region to transmit data (and/or voice) information by selecting from among the 29 channels currently utilized by NATS Network radio sets. Among other features (described in greater detail below), the ADS and GDG of the present invention also enable the current NATS Network to support the following new services: 1) the packet-mode-based transmission of voice and or data information, 2) the transmission of files of data to and from subscribing aircraft, 3) expanded public correspondence services, 4) an encryption method to protect transmitted voice or data information from unauthorized access, and 5) the implementation of protocols which are compatible with commercial off-the-shelf software and protocols.

The high level goal of the present invention is to provide a seamless transmission control protocol/Internet protocol (TCP/IP) network to subscribing customers by enhancing the currently known capabilities of the NATS Network. One of the foundations for a network in accordance with the present invention is AT&T's patented IP addressing scheme for ground stations and airborne radios. The method and apparatus of the present invention provides customers such as airlines with an alternative to traditional data services. By using standard Internet protocols such as TCP/IP, customers implementing a data network in accordance with the present invention are able to enjoy the many benefits of a modem wide area network (WAN) for their operational and maintenance communications needs. Since TCP/IP is a commercially accepted protocol with a large base of applications, it is possible to provide new services in a timely and more cost efficient manner than previously possible.

Networks in accordance with the present invention also include the added benefits of security, mobility, a dedicated channel (for higher throughput), and a reliable network transport that offers an attractive option for air-to-ground and ground-to-air data needs.

Figure 1:
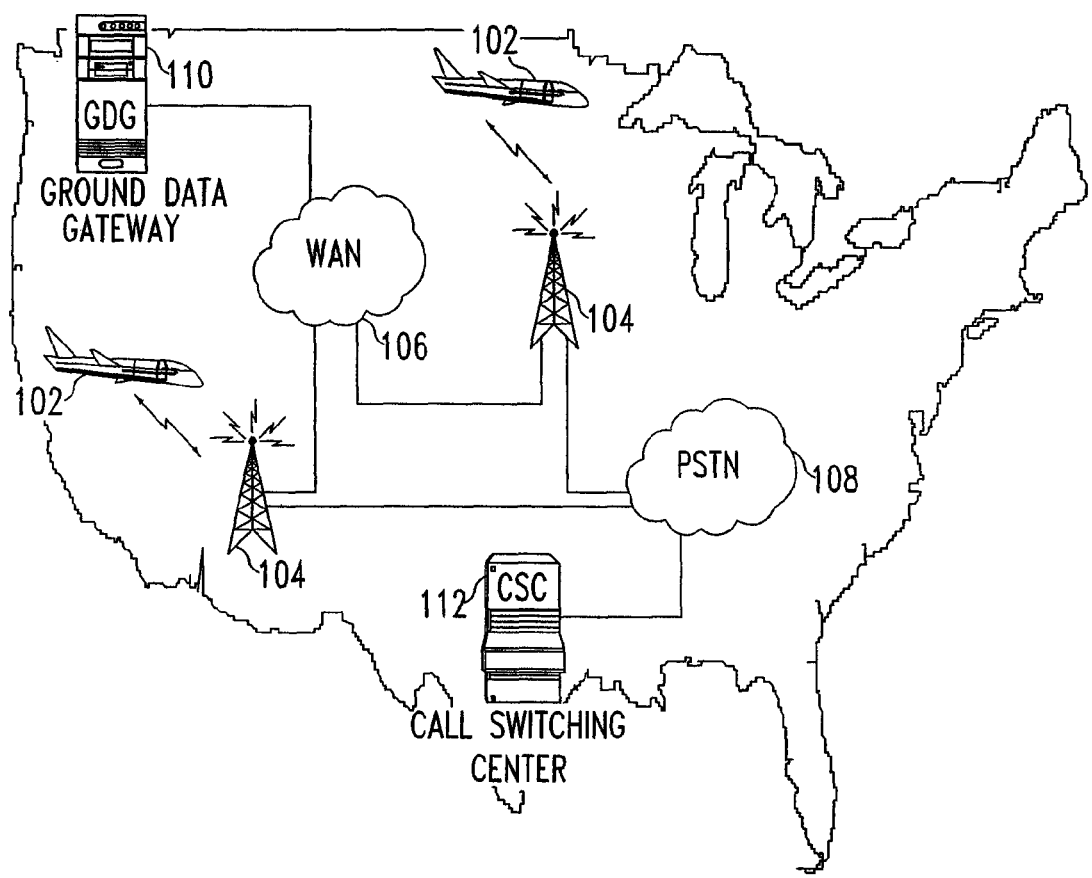
FIG. 1 is a block diagram of a network suitable for practicing an embodiment of the present invention.

FIG. 1 is a block diagram of a network suitable for practicing an embodiment of the present invention. In FIG. 1, each subscribing aircraft 102 is flying within proximity of a ground station 104. Each ground station 104 may be, for example, a tower equipped with an antenna for transmitting and receiving radio frequency signals. Although two subscribing aircraft and two ground stations 104 are illustrated in FIG. 1, the present invention may include a greater or lesser number of either. Each subscribing aircraft includes an airborne system architecture which will be described below with reference to FIG. 2. The airborne system architecture aboard each subscribing aircraft 102 and each ground station 104 are adapted to communicate using one or more of a plurality of system frequencies.

FIG. 1 also illustrates a WAN adapted to connect each ground station 104 to a ground data gateway (GDG) 110. GDG 110 may be, for example, a general purpose computer. An example of a GDG will be described in more detail below. FIG. 1 also illustrates each ground station 104 adapted to be connected to a public switched telephone network (PSTN) 108. Additionally, a call switching center (CSC) 112 is adapted to be connected to PSTN 108.

Figure 2:
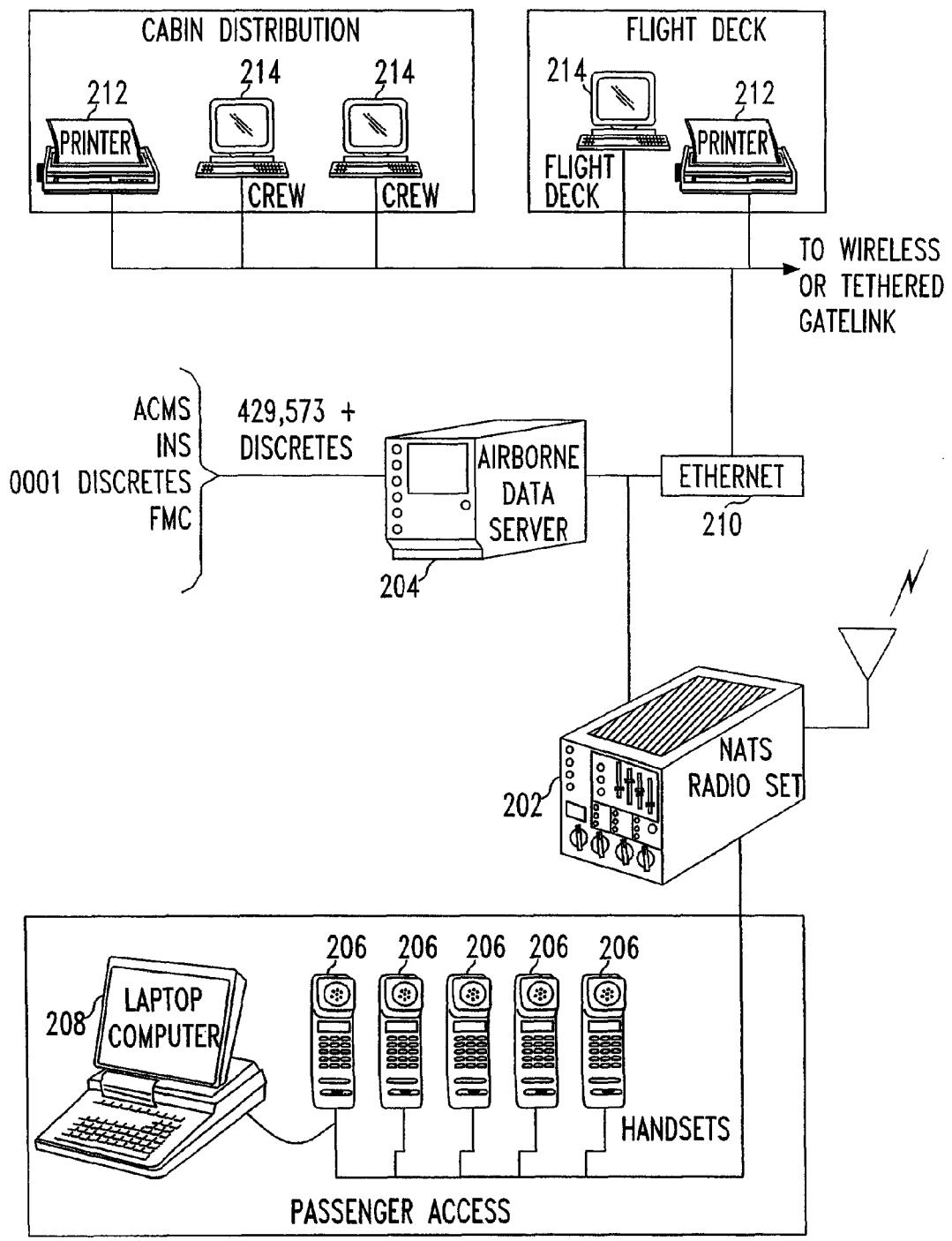
FIG. 2 is a block diagram of an example of an airborne system architecture which may be installed in a subscriber aircraft in accordance with an embodiment of the present invention.

FIG. 2 is a block diagram of an example of an airborne system architecture which may be installed in a subscribing aircraft in accordance with an embodiment of the present invention. In FIG. 2, a NATS radio set 202 is adapted to be connected to an airborne data server (ADS) 204. NATS radio set 202 is a known device manufactured by the AT&T Corp. In accordance with the present invention, this known device is modified in software and hardware as illustrated in greater detail below. ADS 204 may be a general purpose computer and will also be described in greater detail below. ADS 204 is adapted to exchange data information with other aircraft systems/components (not shown in FIG. 2) such as an Aircraft Condition Management System (ACMS) or an aircraft discrete. ADS 204 is also adapted to be connected to one or more local area networks (LAN's) such as ethernet 210. In FIG. 2, two printers 212 (one in the aircraft cabin and one in the aircraft flight deck) and three general purpose computers 214 (two distributed in the aircraft cabin and one in the aircraft flight deck) are each adapted to be connected to ADS 204 via ethernet 210. A greater or lesser number of printers and general purpose computers may be included in the system architecture in accordance with the present invention.

FIG. 2 also illustrates five telephone handsets 206 adapted to be connected to NATS radio set 202. A laptop computer 208 is adapted to be connected to NATS radio set 202 via a telephone handset 206. Voice or data information from one of handsets 206 may be sent to ADS 204 via NATS radio set 202. Voice or data information to one of handsets 206 may be received from ADS 204 via NATS radio set 202.

The method for providing data communications services in accordance with the present invention will now be described in general terms with reference to FIG. 1 and FIG. 2. To transmit data from a subscriber aircraft 102 to a ground-based destination device, ADS 204 receives voice or data information (as appropriate) from one or more of the various sources described above and encapsulates the voice or data information into packets in accordance with a protocol such as TCP/IP. These TCP/IP encapsulated packets are then sent to NATS radio set 202. NATS radio set 202 then modulates a system frequency using these encapsulated data packets and transmits the modulated signal through the air to the ground station currently providing the strongest signal to the NATS radio set aboard the originating subscriber aircraft 102. The receiving ground station 104 demodulates the received signal to recover the encapsulated packets and sends these packets to GDG 110. GDG 110 routes either the received data packets, the data included within the data packets or the received data encapsulated in accordance with another protocol (such as X.25) to the appropriate ground-based destination device. This destination device may be, for example, a general purpose computer (not shown in FIG. 1) adapted to be connected to GDG 110, a general purpose computer (not shown in FIG. 1), adapted to be connected to GDG 110 via a network such as the Internet, or a telephone adapted to be communicated to GDG 110 via PSTN 108.

A subscriber aircraft 102 may also receive voice or data information (whether or not in response to a query from the aircraft). The voice or data information from a ground-based device (not shown in FIG. 1) is received at GDG 110. GDG 110 then determines which ground station 104 is currently servicing the subscriber aircraft 102 on which the destination device is located. GDG 110 then encapsulates the received voice or data information in accordance with a protocol such as TCP/IP and sends the data packets to the determined ground station 104. The ground station 104 modulates a system frequency using the received data packets and transmits the modulated signal through the air to the aircraft on which the destination device is located. The modulated signal is received by the NATS radio set 202 aboard the aircraft. The NATS radio set demodulates the received signal and sends the data packets to the ADS 204. ADS 204 sends either the received data packets, the data within these packets or the data encapsulated in accordance with another protocol to the intended destination device. Examples of the destination device may include another aircraft system, a telephone handset 206, a laptop computer 208 or computer(s) 214.

Some of the above described components of the present invention and more specific examples of how the method and apparatus of the present invention may be implemented to provide data services to an aircraft will now be described.

Figure 3:
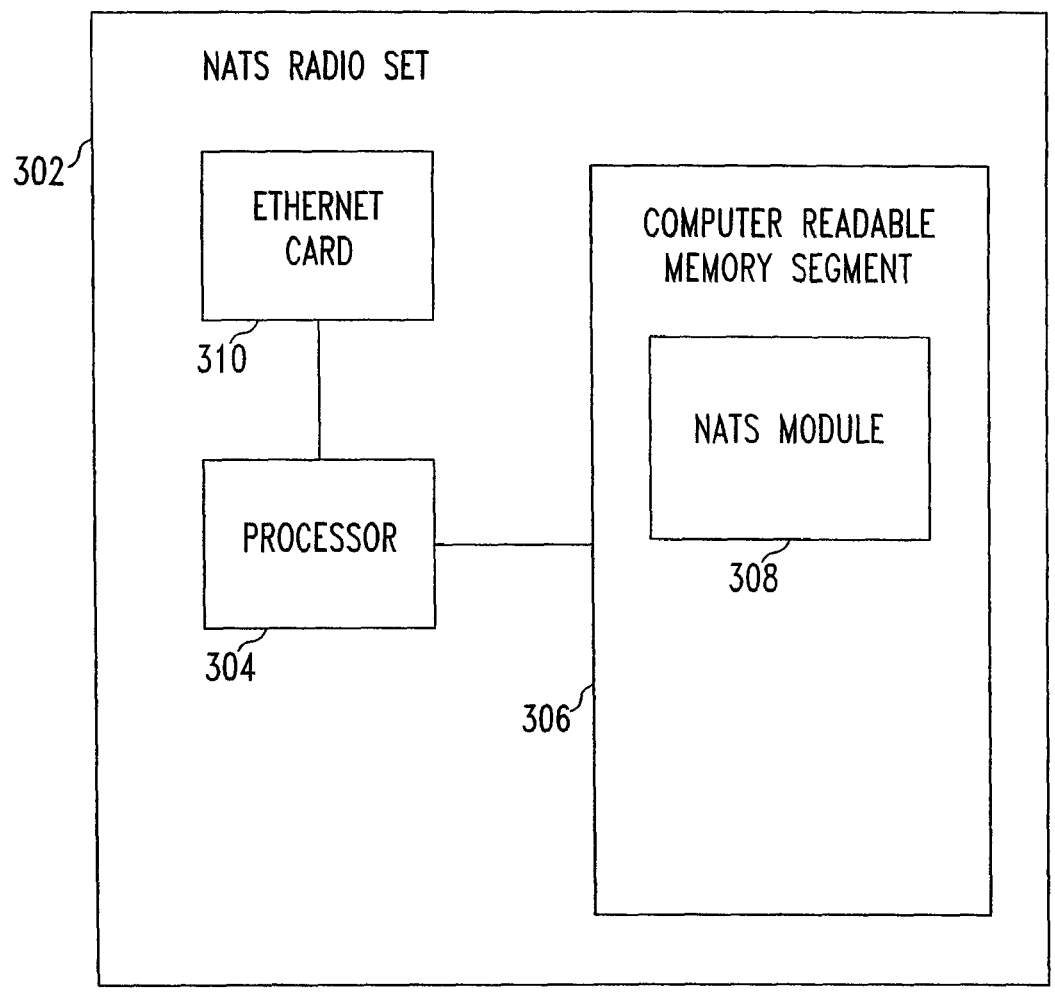
FIG. 3 is a block diagram of a North American Terrestrial System (NATS) radio set modified in accordance with an embodiment of the present invention.

FIG. 3 is a block diagram of an AT&T North American Terrestrial System (NATS) radio set modified in accordance with an embodiment of the present invention. In FIG. 3, a NATS radio set 302 comprises a processor 304 adapted to be connected to a computer readable memory segment 306 and an ethernet card 310. Computer readable memory segment 306 stores computer program code segments which, when executed by processor 304, implement the NATS radio set functions described throughout this document. These computer program code segments are included within one NATS module 308. Although in this embodiment of the invention the computer program code segments are shown in one module, it can be appreciated that this module can be further separated into more modules and still fall within the scope of the invention.

In general terms, the computer program code segments within NATS module 308 perform the following functions which will be described in more detail below: 1) modulate a system frequency using data packets received from the ADS and transmit the modulated signal to a ground station; 2) demodulate signals received from ground stations to obtain the data packets included within these signals and send these data packets to the ADS; 3) implement procedures for switching between ground stations; 4) queue data packets received from the ADS, as necessary, during switching operations; and 5) seize a system channel in response to receiving a page from a ground station using a pilot channel.

Figure 4:
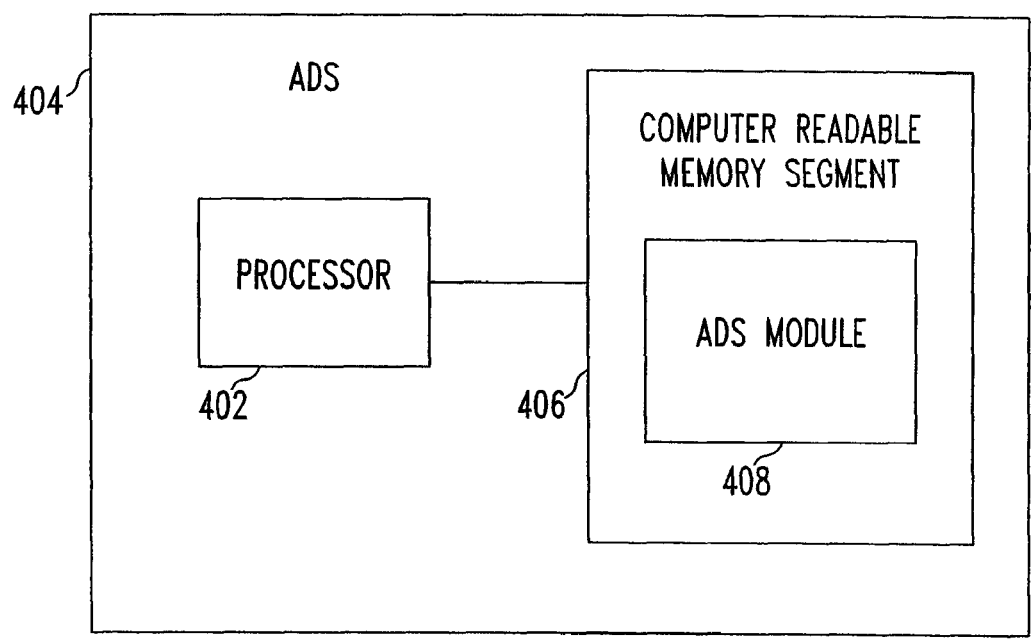
FIG. 4 is a block diagram of an airborne data server (ADS) in accordance with an embodiment of the present invention.

FIG. 4 is a block diagram of an airborne data server (ADS) in accordance with an embodiment of the present invention. In FIG. 4, an ADS 404 comprises a processor 402 adapted to be connected to a computer readable memory segment 406. Computer readable memory segment 406 stores computer program code segments which, when executed by processor 402, implement many of the ADS functions described in this document. These computer program code segments are included within an ADS module 408. Although in this embodiment of the invention the computer program code segments are shown in one module it can be appreciated that this module can be further separated into more modules, and still fall within the scope of the invention.

In general terms (for air-to-ground transmissions), the computer program code segments of ADS module 408 receive voice or data information from an aircraft system or device, encapsulate the voice or data information into packets in accordance with a protocol such as TCP/IP and send these encapsulated data packets to a NATS radio set. In general terms (for ground-to-air transmissions), the computer program code segments of ADS module 408 receive TCP/IP encapsulated packets from a NATS radio set 202, remove the encapsulation and send the packets to the appropriate aircraft system or aircraft device. Other ADS functions which may be implemented using ADS module 408 will be described below.

The ADS provides data communications services for airline operational information (e.g., maintenance and operations communications) as well as new data applications targeted directly for the passenger. The ADS provides the core communications functions of the present invention. The ADS provides both on-board and off-board communications.

On the on-board side, the ADS provides connection to passengers using the cabin distribution system, as well as to the flight crew and maintenance personnel using application terminals on Ethernet connections. Connection to avionics equipment is via, for example, Aeronautical Radio Incorporated (ARINC) 429, 573 or 646 and avionics discrete interfaces.

On the air-to-ground side, the ADS may communicate using various means including connections via direct or wireless Ethernet, AT&T NATS connections, or SATCOM Data3. While several communications paths are or will in the near future be available aboard aircraft, the cornerstone of the present invention is the air-ground link provided by the AT&T NATS Network.

In one embodiment, the ADS relies on commercial operating system software and AT&T provided communications system software to provide the overall functionality of the system.

In one embodiment, the ADS may include the following components: an ARINC-429 and discretes card, Single Board Computer, a power supply, a mass storage and a custom filtering/interface card. All applications may be built upon a commercially available operating system.

In one embodiment, the ADS is packaged in a 6 MCU, ARINC 600 package utilizing forced air cooling. The ADS relies largely on the use of commercial off-the-shelf (COTS) hardware, taking advantage of the economy of scale of design that is enjoyed by the commercial PC market presently.

The Airline Electronic Engineering Committee (AEEC) has established project number 645 under the Systems Architecture and Interfaces (SAI) subcommittee to create an ARINC specification for the Airborne File Server architecture. Several airlines have historically expressed interest in an Airborne File Server but have been reluctant to sign up without an underlying ARINC specification. The goal of the SAI-645 subcommittee will be to define a footprint and pin definition for Airborne File Servers.

In one embodiment of the present invention, the ADS provides means for passengers to access data using the existing AT&T cabin telephone system. To use the interface, the passenger accesses the ADS by connecting his or her laptop to the RJ-11 connector on the base of the handset or in the handset cradle. Passengers are able to attain a high-speed connection (up to 56 kbps with today's modems) into the ADS. In this embodiment of the present invention, the ADS behaves as an Internet Service Provider (ISP), providing logon and authentication and can serve out content through an on-board Intranet. In one embodiment of the present invention, the ADS includes at least one modem which is utilized to exchange data between the ADS and a modem within a laptop computer or general purpose computer.

The ADS may be pre-loaded with static data while on the ground. This data may be data that the airline deems to be usable or interesting to passengers while in flight. (Example content might be the airline's home page and accompanying links, details of the flight's destination city or sky mall type shopping.) Timely data, such as sports scores and stock quotes, may be uploaded to the aircraft on a periodic basis while in flight. The majority of user transactions in this embodiment do not require an air-ground link. When a user action does require an air-ground link (i.e., a shopping transaction occurs or an e-mail account needs to be accessed), the ADS routes the traffic through the AT&T NATS radio set allowing the transaction to complete. This approach provides high-speed access for the user to obtain data using publicly accepted methods of interconnecting. Additionally, this embodiment requires no modifications to the existing aircraft telephone cable plant. For example, a private branch exchange (PBX) (used in one embodiment of the present invention to provide switching functions between the plurality of handsets and the ADS) is currently included within either the NATS radio set or a cabin telephony unit (CTU) of the existing aircraft telephone cable plant.

Figure 5:
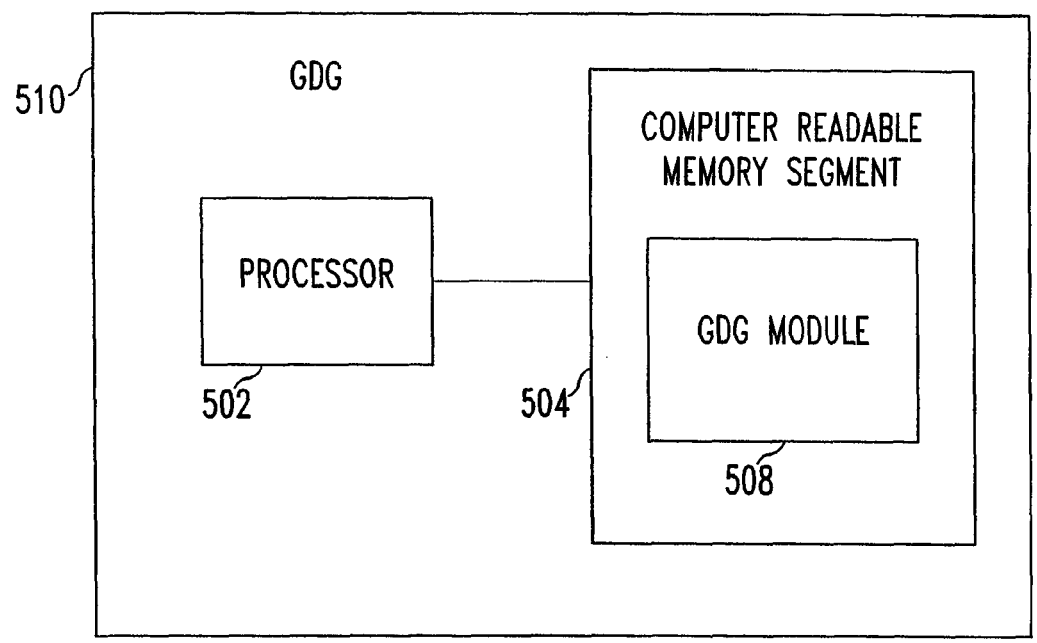
FIG. 5 is a block diagram of a ground data gateway (GDG) in accordance with an embodiment of the present invention.

FIG. 5 is a block diagram of a ground data gateway (GDG) in accordance with an embodiment of the present invention. In FIG. 5, GDG 510 comprises a processor 502 adapted to be connected to a computer readable memory segment 504. Computer readable memory segment 504 stores computer program code segments which, when executed by processor 502, implement many of the GDG functions described throughout this document. These computer program code segments are included within one GDG module 508. Although in this embodiment of the invention the computer program code segments are shown in one module it can be appreciated that this module can be further separated into more modules, and still fall within the scope of the invention.

Using GDG module 508, the GDG routes IP packet traffic (for example, data encapsulated in accordance with TCP/IP) to and from the airborne ADS. A core function of the GDG is maintenance of route information so that the GDG can forward IP packets to the correct ground station to service a particular ADS. The GDG may also include firewalled links to the Internet and corporate information systems.

Each IP packet from an ADS may be encapsulated in a private message format that includes information which allows the GDG to validate it. For instance, the airline and aircraft identifier of each ADS may be included in every message exchanged by the ADS and GDG. Validation provides the ability to enable/disable features for a particular ADS based upon the requirements of the customer. In addition, this validation information allows the GDG to maintain state and billing information for each ADS on a per-message basis.

The GDG may also act as a centralized point for accounting purposes since each IP packet between an ADS and a final destination host must pass through it. As a packet passes through the GDG, each ADS can be identified by its unique address, thereby providing a per-ADS statistical accounting capability. Additionally the length of each message may be recorded so that the data exchanged can be accounted for with granularity to the nearest byte (if so desired). In the unlikely event that a message is lost over the radio link, the ground station can notify the GDG of the loss so that the statistics recorded can be properly adjusted.

The GDG may also make use of a number of security techniques to protect a network in accordance with the present invention. First, the GDG's connection to hosts outside the network may be firewalled behind dedicated servers. These firewalls allow for IP address and port filtering.

Secondly, all messages exchanged between the ADS and GDG may be encrypted to provide a secure radio link. The only entry points to the network may be behind the ADS's onboard LAN or behind the GDG's firewall.

Thirdly, each message exchanged between the ADS and end destination may pass through the GDG's message engine where its source/destination IP address and port numbers can be validated. This provides the ability to turn on trusted services to trusted hosts while disabling untrusted services and/or hosts.

In a scheme analogous to corporate Internet proxies, the GDG may manipulate the source IP address of each packet as it leaves the present invention network for the Internet. In doing so, each packet from an ADS appears to come from the GDG when it arrives at the destination host. Similarly, packets destined to return to the ADS may be addressed to the GDG. This protects the true identity of hosts behind the GDG (i.e., ADS) from untrusted hosts on the Internet.

A number of ground-based hosts may serve in a supporting role to the GDG. These hosts are referred to as packet data application servers. A brief description of their services is provided herein.

A real-time application server may be used for transactions that require immediate processing. For instance a Post Office Protocol 3 (POP3) e-mail server would allow for real-time retrieval of e-mail messages from a ground server. Another service that could make use of the real-time application server would be a credit transaction processing service. This service could provide onboard credit card validation using ground-based validation servers.

A store and forward application server may provide an efficient means of sending data to an ADS. A subscribing airline can have data sent to an ADS by first transferring the data to the store and forward server. This server is then responsible for contacting the GDG to establish a link to the destination ADS. Once this is accomplished, the store and forward server can transfer the data over the present invention network. Pushing the data transfer details back to the store and forward server veils the details of reaching an ADS from the host which initiated the data transfer. For instance, if an ADS is currently unavailable (i.e., because it is out of radio contact or the aircraft is powered down), the application server can hold on to the data until such time that it can be delivered.

Many applications of interest make use of pre-packaged data. For instance weather, news, sports, etc. will need to be updated periodically and be available immediately when requested by an ADS. Since this information is likely to be requested by numerous ADSs it can be cached by an application server and provided instantly when requested.

In the airline information systems arena, data exchanged between the aircraft and ground systems are often formatted in legacy formats. Furthermore the networks used are often older technologies (i.e., X.25). To facilitate serving this kind of data need, the GDG can employ application servers which format data for legacy systems. This allows the present invention network to service customers in a manner which they are accustomed to while enjoying the advances of a modem network.

The physical layer of a NATS radio set modified in accordance with the present invention is implemented using a full-duplex digital modulation scheme. The channel is encoded with a forward error correction (FEC) scheme applied to scrambled, interleaved data frames. The data frames can contain voice, voice band data, or packetized data traffic.

The link layer of the data service may be implemented using a Link Access Protocol Balanced (LAPB)-inspired High Level Data Link Control (HDLC) layer called Radio Link Protocol (RLP). This layer includes such functionality such as:
  Sliding window flow control
  Selective repeat automatic repeat request (ARQ)
  CRC data protection The RLP Frame size fits within the limitations of the existing AT&T NATS radio's physical layer frame size. Due to this sizing constraint, RLP is responsible for fragmenting larger packets from higher layers.

The Packet Data Protocol (PDP) provides a peer-to-peer layer between the air and ground radios for reliable, sequenced delivery of packets. Packets consist of multiple frames from the RLP layer. Combined together, these frames form an atomic message that is fit for consumption by the edge servers (ADS and GDG).

The messages that are transferred across the radio link by the PDP layer contain IP packets encapsulated into a proprietary message format. The message structure may contain a number of fields such as:
  Message Type
  Message Length
  Airline/Aircraft ID
  User Data
  Status These fields allow the PDP layer to provide the following examples of services:
  Session setup/teardown
  Validation (refer to the GDG validation section for details)
  Channel bonding (aggregation of radio channels into a
    super-channel for higher throughput)

Before IP packets are encapsulated inside PDP data messages, they may be optionally compressed using Lempel-Ziv (LZ) and encrypted using 128-bit Triple-Data Encryption Standard (Triple-DES) technology or equipment algorithms. This provides higher throughput for uncompressed data and adds an extra layer of security to the radio link portion of the network.

In order to provide IP addresses to equipment connected to the ADS airborne LAN, a network address translation (NAT) scheme may be used. With NAT a set of IP addresses for multiple hosts are translated into a single IP address by a NAT router. The GDG acts as the NAT router in this embodiment. The onboard equipment can be assigned unique (but publicly unroutable) IP addresses which, when passed through the GDG proxy, are translated into the routable address of the GDG. In this respect, hosts outside of the present invention network (i.e., Internet) will believe that a single routable host (the GDG) is responsible for all traffic from the present invention network.

In order to provide mapping from the single IP address of the GDG to the multiple IP addresses of the onboard hosts, a correlation may be made between source IP+PORT number and the translated IP+PORT.

For instance, imagine two airborne host applications with source IP+PORT of 10.0.0.1+5000 and 10.0.0.2+5000 respectively. These may be mapped into source IP+PORT of 11.0.0.1+6000 and 11.0.0.1+6001. Hence a single GDG (with IP address of 11.0.0.1) can route returning IP packets to the proper onboard host by consulting a table which tracks this translation.

Virtual Private Networks (VPNs) allow for private point-to-point data sessions across public data networks. A variety of proposed standards such as layer 2 tunneling protocol (L2TP) or point-to-point tunneling protocol (PPTP) provide this service. In the context of the present invention network, a VPN allows the end user to access hosts beyond the edge servers (ADS and GDG) as if they were integral parts of their network. For instance, an onboard server can be made a trusted host within a groundbased network even though data is routed over a shared present invention network.

A key attribute of the present invention network is the ability to present a seamless network layer to the end applications. To accomplish this in the mobile radio environment requires a mechanism for switching the airborne radio between different ground stations.

The NATS airborne radio constantly monitors metrics such as the received signal quality, Doppler shift, and bit-error-rate (BER) of the radio link. If one or more of these metrics fall below a configurable threshold, the airborne radio retunes its transceiver to another ground station with a better signal such that acceptable data transfer can be maintained.

In order to reach an airborne radio, the GDG must track which ground station an airborne radio is currently tuned to. One method for accomplishing this entails requiring each NATS radio set to register at each new ground station as it is selected. The process of registering consists of a short burst of traffic that identifies the airline and aircraft ID numbers of the airborne radio. The ground station relays this information along with its own identifier to the GDG. With this information in hand, the GDG can determine which ground station to route data through for a particular ADS.

Using the location tracking information, the GDG is able to page a particular airborne radio. It merely sends a page request to the ground station that a NATS radio set is known to be registered to. This page is then forwarded to the NATS radio set using the ground station's pilot channel. Upon realization that the page is addressed to it, the NATS radio set acts upon the page by seizing a radio channel and setting up a path (also referred to as a radio or data link) for subsequent data transfer. At this point, the network behaves as if the ADS (rather than the GDG) had initiated the request for a data path.

Another embodiment of the present invention utilizes an asymmetric data transfer technique. This embodiment is well suited to many applications. For instance, world-wide-web traffic is asymmetric in nature. The back channel from the client to the web server typically requires very little bandwidth. The information in this direction consists of URLs and acknowledgment packets. However, traffic on the forward channel can often be very bandwidth intensive (graphics, large documents, etc.).

In the context of the present invention network, the implementation is readily apparent. The back channel would make use of the present invention network while the forward channel could use one of the emerging high bandwidth systems. This enables previously unpractical applications such as passenger Internet access, streaming audio/video, etc.

In yet another embodiment of the present invention, voice traffic is transported over IP. Using compression algorithms, speech is encoded into packets which are transported over an IP network. Products that make use of this technology are currently available for use over the Internet. This embodiment provides an efficient alternative for voice communications to and from the aircraft.

Figure 6:
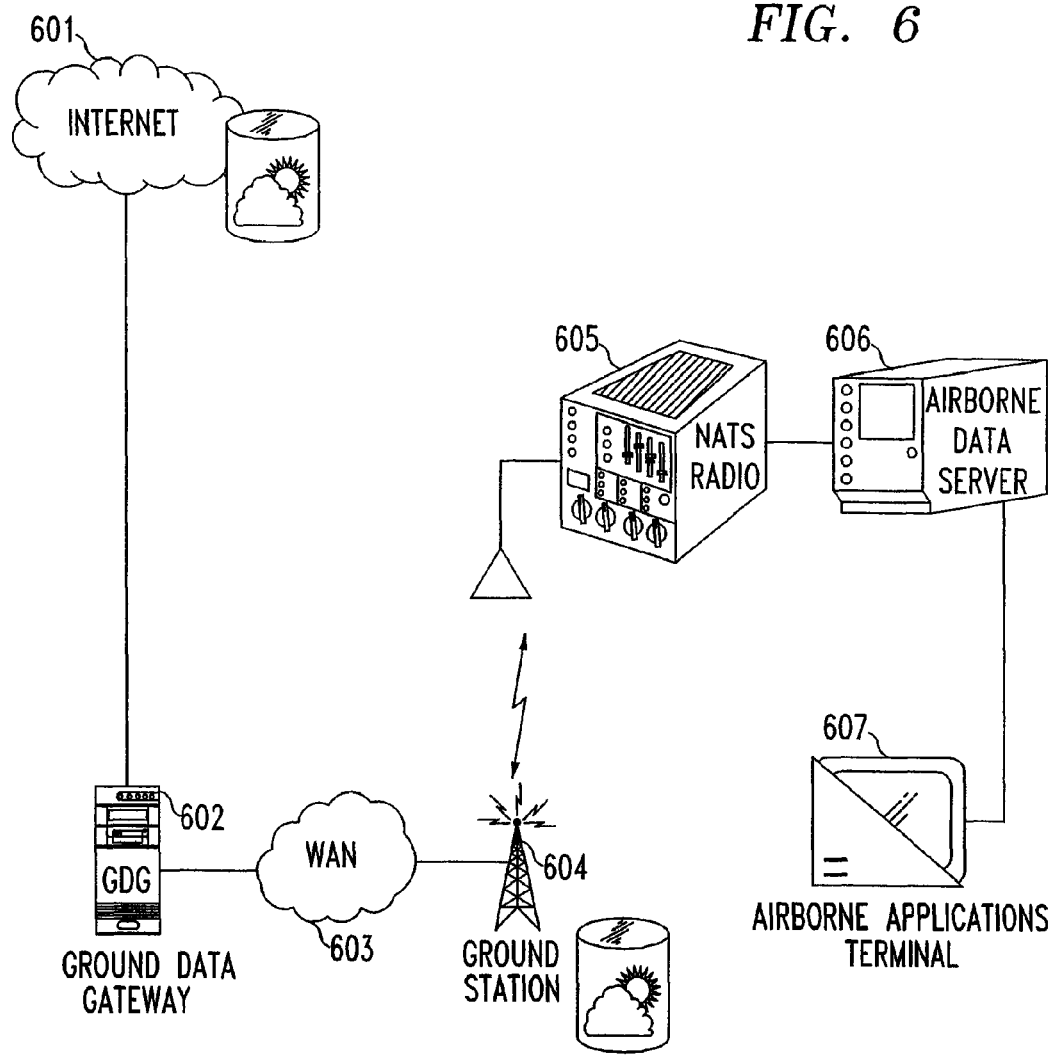
FIG. 6 illustrates an example of the flow of data involved in delivering a weather map to an airborne application terminal aboard a subscribing aircraft in accordance with the present invention.

In one example of how the present invention network may be applied, a high quality weather map may be delivered to the flight deck. FIG. 6 illustrates an example of the flow of data involved in delivering a weather map to an airborne applications terminal aboard a subscribing aircraft in accordance with the present invention. The weather map is first retrieved from a pre-arranged source (possibly from a server connected to the Internet 601 or a dedicated connection to an electronic map warehouse). The map is then cached on the GDG 602 so that, if multiple aircraft request the same file, the GDG needn't duplicate the retrieval effort. Next the map is transferred (using FTP) from the GDG to the ADS 606. In doing so the file traverses the WAN 603, Ground Station 604, and NATS Radio set 605. Finally the file can be transferred to the Airborne Applications Terminal 607 for final display (using perhaps a web browser). Airborne Applications Terminal 607 may be, for example, a crew or flight deck general purpose computer 214 as illustrated in FIG. 2.

The weather map application can work in either a push or pull fashion. In the push scenario, the map is sent to the aircraft based on a predetermined rule set (perhaps time of day, aircraft routing, etc.). In the pull case, the ADS requests the map based on either a pre-determined rule set or interaction from the end user of the Airborne Applications Terminal.

Figure 7:
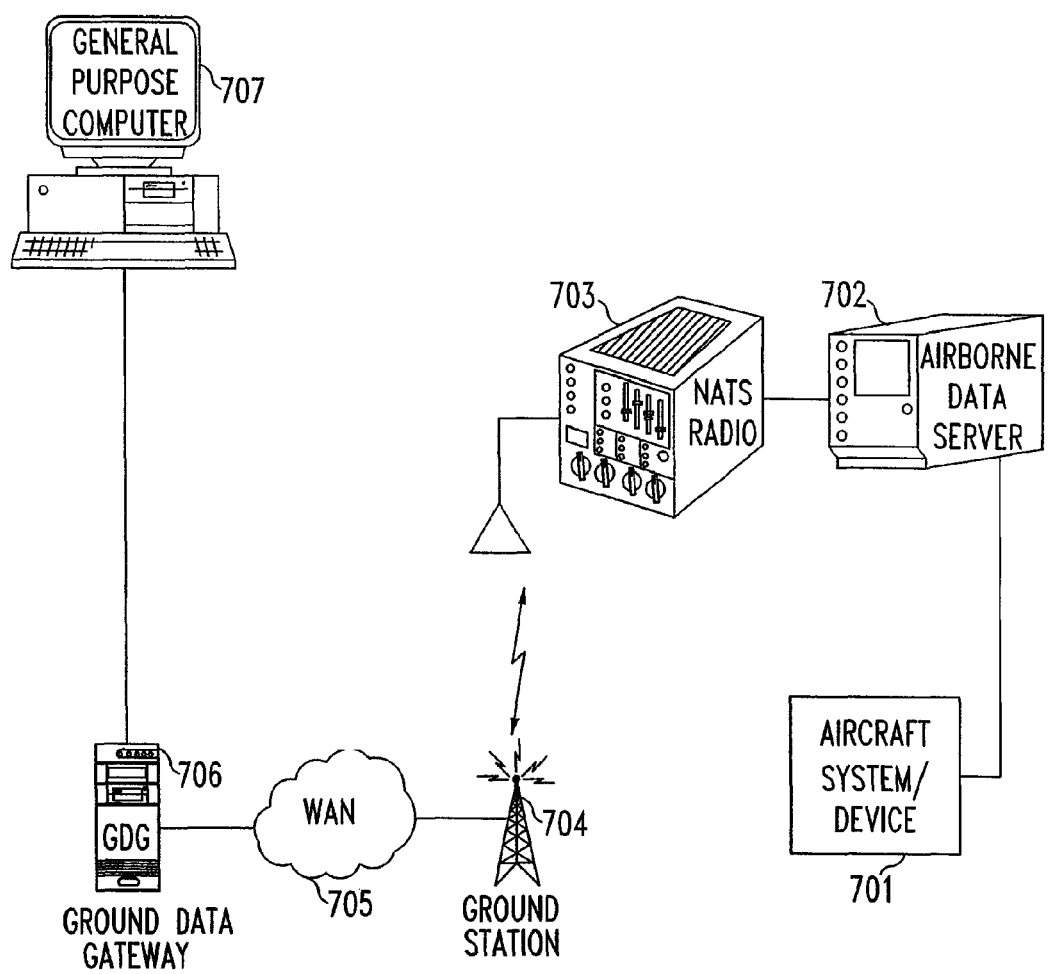
FIG. 7 illustrates an example of the flow of data involved in delivering data from a subscribing aircraft to the dispatch in accordance with the present invention.

In another example of how the present invention may be applied, aircraft data may be sent to the dispatch. Examples of this data include the following: engine data, aircraft attitude data, engine speed/temperature data, weight on wheels data, and the time the aircraft doors are opened or closed. FIG. 7 illustrates an example of the flow of data involved in delivering data from a subscribing aircraft to the dispatch in accordance with the present invention. First, an aircraft system or device 701 sends the data to the ADS 702. The aircraft system or device 701 may be (for example) an aircraft discrete, a relay, a switch, an aircraft BUS, a piece of avionics equipment, an ACMS system, or an ACARS MU. The ADS 702 may process the received data prior to encapsulating the data into packets and sending the data packets to the NATS radio set 703. For example, the ADS 702 may process the data to generate an ACMS report which indicates which data parameters are outside of predetermined parameters.

The NATS radio set 703 then transmits the data packets to a ground station 704. Ground station 704 then sends the data packets to the GDG 706 via WAN 705. GDG 706 may then route the data to a general purpose computer 707 at the dispatch location after removing the encapsulation.

In another example of how the present invention may be applied, flight management system software updates may be sent from a dispatch location to avionics equipment aboard the aircraft. In this application, the data essentially follows the reverse of the flow described above with respect to FIG. 7. The aircraft device 701 may be any piece of avionics equipment aboard the aircraft requiring data or software updates. The ADS 702 may send the data update to the intended avionics equipment using a known protocol such as ARINC 615.

Figure 8:
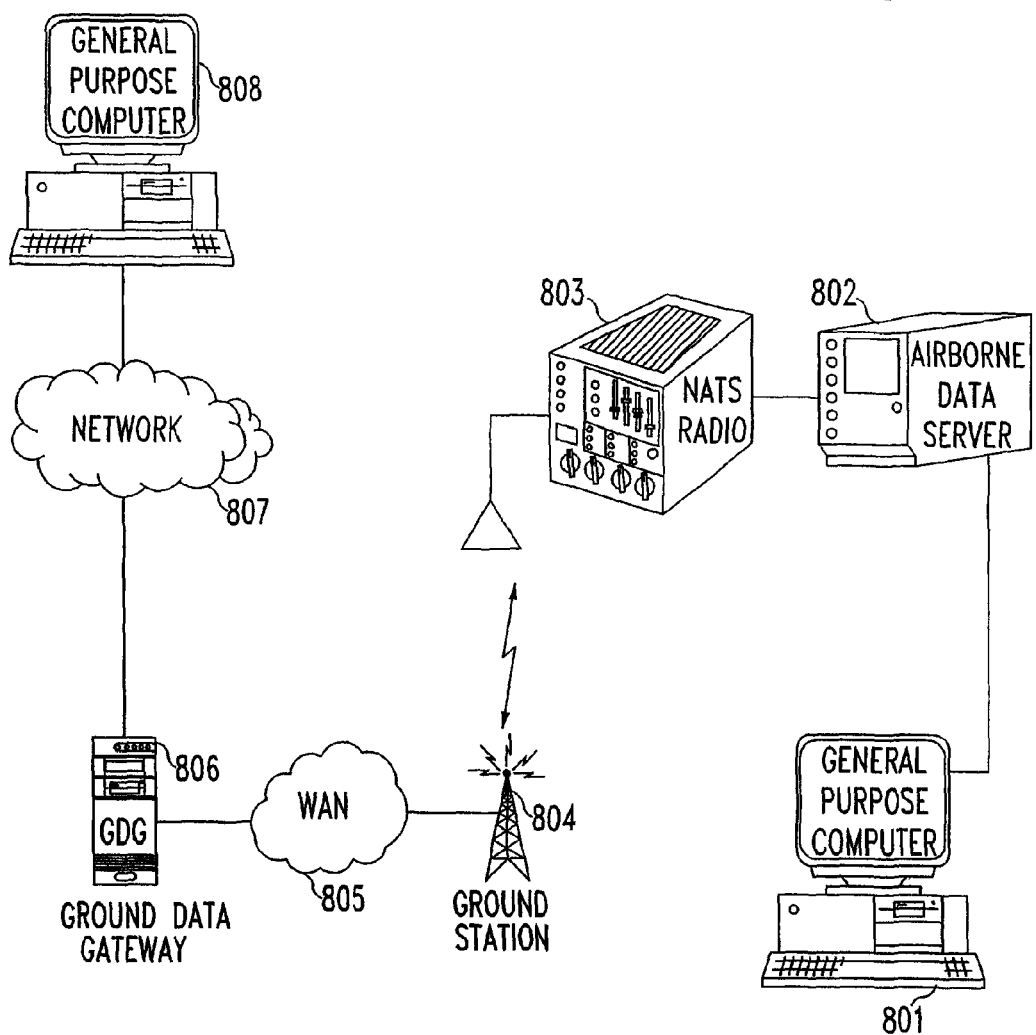
FIG. 8 illustrates an example of the flow of data involved in exchanging data between a laptop utilized by a passenger or crew member and a ground-based computer in accordance with the present invention.

In another example of how the present invention may be applied, a passenger or crew member may exchange data with a ground-based computer connected to a network. The passenger may wish to access a server connected to an office LAN or access an Internet Web site supported by a server connected to the Internet. The crew may wish to notify dispatch that a piece of equipment on the aircraft needs repair/replacement. FIG. 8 illustrates an example of the flow of data involved in exchanging data between a laptop utilized by a passenger or crew member and a ground-based computer. For the air-to-ground transmission, the passenger or crew member uses a general purpose computer 801 to send data or a query to the ADS 802. General purpose computer 801 may be a laptop computer connected to an existing telephone handset as illustrated in FIG. 2. The ADS encapsulates the data or query into packets and sends the data packets to the NATS radio set 803. The data packets then follow a path to GDG 806 via ground station 804 and WAN 805 as described above. GDG 806 removes the encapsulation, if necessary, and then routes the data or query to destination computer 808 via network 807. Network 807 may be, for example the Internet. Destination computer 808 may be directly connected to GDG 806 rather than through a network such as network 807. The flow of data from destination computer 808 back to general purpose computer 801 follows the reverse of these steps.

Figure 9:
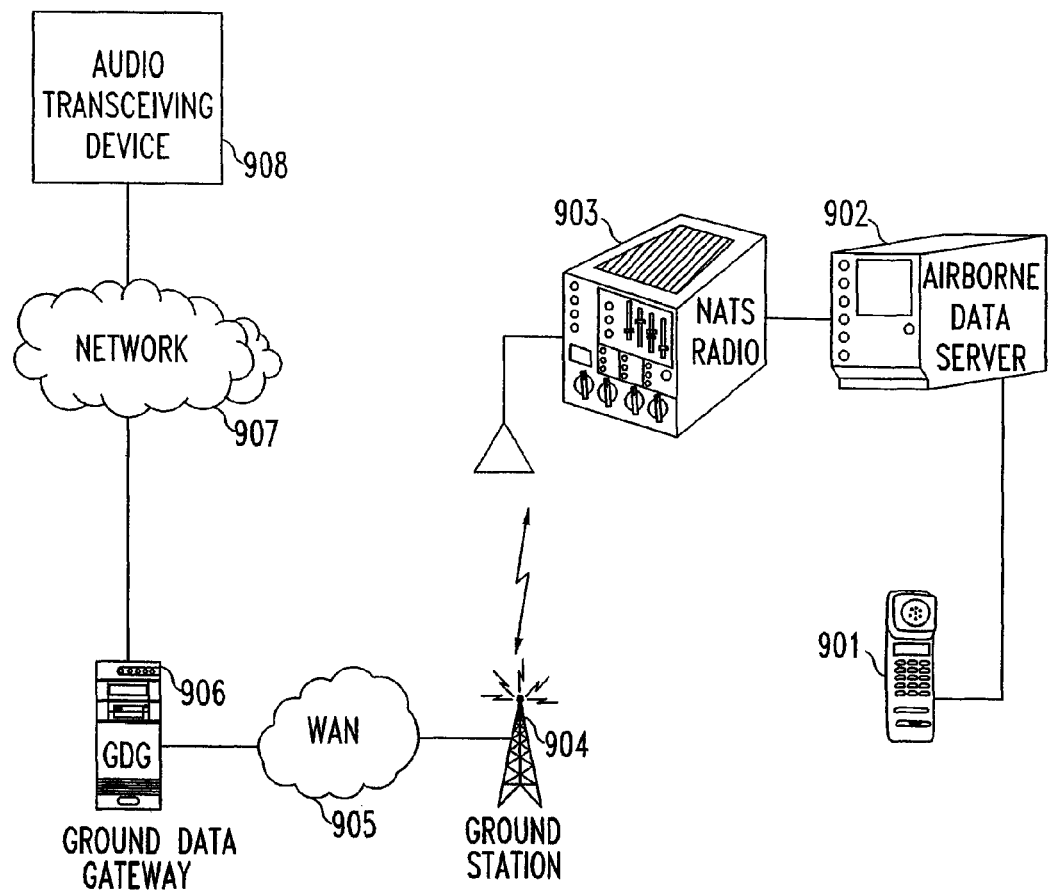
FIG. 9 illustrates an example of the flow of data involved in completing a telephone call in accordance with the present invention.

As described above, the present invention may be applied to enable an airline passenger or crew member to make a voice telephone call to someone on the ground. FIG. 9 illustrates an example of the flow of data involved in completing a telephone call in accordance with the present invention. Voice information or a call initiation request is sent from telephone handset 901 to ADS 902. ADS 902 encapsulates the received data and sends the data packets to NATS radio set 903. The data packets traverse ground station 904 and WAN 905 to arrive at GDG 906 as described above. GDG 906 then removes the encapsulation, if necessary, and routes the data packets to audio transceiver device 908 via a network 907. Network 907 may be a PSTN or an IP network. Audio transceiving device 908 may be, for example, a telephone connected to the PSTN, a wireless telephone communicating with a PSTN or an IP network, or a general purpose computer adapted to process IP voice packets and connected to an IP network. Voice data from audio transceiving device 908 follows the reverse of the above described data flow.

Although several embodiments are specifically illustrated herein, it will be appreciated that modifications and variations of the present invention are covered by the above teachings and within the purview of the appended claims without departing from the spirit and intended scope of the invention. For example, the above described methods may be adapted to transmit data between a subscribing aircraft and a ground-based device via a satellite when the subscribing aircraft is out of range of the plurality of ground stations. In a manner similar to that described above with reference to airline passengers or crew members initiating telephone calls from the aircraft to a ground-based telephone device, the present invention is also intended to permit airline passengers or crew members aboard the aircraft to receive telephone calls initiated from a ground-based telephone device.

What is claimed is:

1. A method for providing data communications services utilizing a North American Terrestrial System (NATS) network, the method comprising:
    receiving, at a first server in an aircraft, data from a first device within the aircraft;
    encapsulating the data into packets in accordance with a transmission control Protocol/Internet protocol (TCP/IP) protocol; and
    sending said data packets to a modified NATS radio set for delivery from the aircraft directly to a ground server adapted to be connected to a plurality of ground stations, via an air-to-ground transmission of the NATS network.

2. The method of claim 1, wherein the encapsulating includes encapsulating voice traffic into Voice over Internet Protocol (VoIP) packets and wherein the sending includes sending the VoIP packets from the aircraft directly to the ground server via the air-to-ground transmission of the NATS network.

3. The method of claim 2, wherein the receiving includes receiving analog voice data via a telephone handset within the aircraft.

4. The method of claim 2, wherein the receiving includes receiving aircraft condition monitoring system (ACMS) data received from one or more sources in the aircraft; and
    further comprising the acts of:
    comparing the received ACMS data to at least one predetermined value; and
    generating one or more reports summarizing a result of said comparing.

5. The method of claim 2, wherein the receiving includes receiving Aircraft Communication Addressing and Reporting System Management unit (ACARS MU) data from at least one of a relay, a switch on an aircraft, or an aircraft bus.

6. The method of claim 2, further comprising, returning static data, pre-loaded on the first server, to the first device in response to the receiving.

7. The method of claim 2, wherein the receiving includes receiving the data from at least one of a general purpose computer or a laptop computer.

8. A method for providing data communications services utilizing a network comprising a first server adapted to be connected to a modified North American Terrestrial System (NATS) radio set and a second server adapted to be connected to a plurality of ground stations, the method comprising:
    receiving, at the first server residing within an aircraft, data from the modified NATS radio set, which is encapsulated into packets in accordance with a transmission control Protocol/Internet protocol (TCP/IP) protocol and received at the modified NATS radio set, within the aircraft, directly from the second server, residing on the ground, via a ground-to-air transmission in the NATS network;
    removing said data from said encapsulated packets;
    storing the data within a memory device adapted to be connected to the first server;
    encapsulating the data in accordance with a second protocol; and
    sending at least one of said received data packets, the data, or said data encapsulated in accordance with said second protocol to a first device on the aircraft.

9. The method of claim 8, wherein the receiving includes receiving Voice over Internet Protocol (VoIP) traffic via the ground-to-air transmission.

10. The method of claim 9, wherein the receiving VoIP traffic includes receiving VoIP traffic at the modified NATS radio set from at least one of a public switched telephone network (PSTN) or an Internet protocol (IP) network over the ground-to-air transmission; and wherein the sending includes sending the at least one of the received data packets, the data, or the data encapsulated in accordance with said second protocol to a telephone handset on the aircraft.

11. The method of claim 9, wherein the sending includes sending the at least one of the received data packets, the data, or the data encapsulated in accordance with said second protocol to at least one of a general purpose computer or a laptop computer.

12. The method of claim 9, wherein the receiving includes receiving flight management system software update information; and wherein the sending includes sending the flight management system software update information to onboard avionics equipment.

13. A method for facilitating data communication employing a North American Terrestrial System (NATS), the method comprising:
- receiving, at a ground data gateway (GDG), data from a first device for transmission to an airborne data server (ADS);
- encapsulating the data into one or more data packets in accordance with a transmission control Protocol/Internet protocol (TCP/IP) protocol;
- determining a ground station serving the NATS, associated with the ADS, to which the data is to be routed; and
- sending the one or more data packets to the determined ground station for direct transmission to a modified NATS radio set, within an aircraft associated with the ADS, over a ground-to-air NATS transmission.

14. The method of claim 13, wherein the encapsulating includes encapsulating voice data into one or more Voice over Internet Protocol (VoIP) data packets.

15. The method of claim 13, further comprising:
- transmitting a page message to the modified NATS radio set via the determined ground station and by employing a predetermined channel;
- seizing a NATS channel employing the modified NATS radio set in response to the page message; and
- establishing a radio link for transmitting the one or more data packets between the modified NATS radio set and the determined ground station by employing the seized NATS channel.

16. A system that provides data communications services utilizing a North American Terrestrial System (NATS), the system comprising:
- an airborne data server (ADS) that receives data from a first device in an aircraft, the ADS encapsulates the data into one or more data packets in accordance with a transmission control protocol/Internet protocol (TCP/IP) protocol; and
- a modified NATS radio set, within the aircraft, that receives the encapsulated data from the ADS and directly transmits the encapsulated data to a ground station, over an air-to-ground transmission link of the NATS, the ground station delivers the encapsulated data to a ground data gateway (GDG).

17. The system of claim 16, wherein the ADS receives analog voice data from the first device, converts the analog voice data to Voice over Internet Protocol (VoIP) packets and delivers the VoIP packets to the modified NATS radio set for transmission.

18. A computer system that provides data communications services utilizing to a North American Terrestrial System (NATS), the system comprising:
- a ground data gateway (GDG) that receives, from a modified NATS radio set aboard an aircraft, data encapsulated into one or more packets in accordance with a Transmission Control Protocol/Internet Protocol (TCP/IP) protocol, wherein the modified NATS radio set transmits the encapsulated data directly to a ground station, connected to the GDG, over a NATS air-to-ground transmission, the GDG extracts the data from the one or more packets and delivers at least one of the one or more packets, the data, or data encapsulated in accordance with a second protocol to a device connected to the GDG.

19. The computer-system of claim 18, wherein the data includes voice traffic encapsulated into one or more Voice over Internet Protocol (VoIP) packets.

20. The computer-system of claim 19, wherein the voice traffic is analog voice data recorded via a telephone handset in an aircraft.

* * * * *